(12) United States Patent
Bäurle et al.

(10) Patent No.: US 7,759,922 B2
(45) Date of Patent: *Jul. 20, 2010

(54) METHOD AND APPARATUS TO PROVIDE TEMPORARY PEAK POWER FROM A SWITCHING REGULATOR

(75) Inventors: Stefan Bäurle, San Jose, CA (US); William M. Polivka, Campbell, CA (US); David Michael Hugh Matthews, Windsor (GB)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/430,709

(22) Filed: Apr. 27, 2009

(65) Prior Publication Data

US 2009/0212755 A1 Aug. 27, 2009

Related U.S. Application Data

(63) Continuation of application No. 12/125,839, filed on May 22, 2008, now Pat. No. 7,538,533, which is a continuation of application No. 11/805,725, filed on May 23, 2007, now Pat. No. 7,388,360, which is a continuation of application No. 10/981,959, filed on Nov. 5, 2004, now Pat. No. 7,239,119.

(51) Int. Cl.
G05F 1/40 (2006.01)
H02H 7/122 (2006.01)
(52) U.S. Cl. ................ 323/284; 323/285; 363/56.1
(58) Field of Classification Search ............ 323/282, 323/284, 285, 351; 363/21.01, 97, 131, 56.1
See application file for complete search history.

(56) References Cited

U.S. PATENT DOCUMENTS

| 5,912,552 | A | 6/1999 | Tateishi |
| 6,295,211 | B1 | 9/2001 | Nishida et al. |
| 6,737,843 | B2 | 5/2004 | Kanakubo et al. |
| 6,809,560 | B1 | 10/2004 | Wrathall |
| 7,239,119 | B2 | 7/2007 | Bäurle et al. |
| 7,388,360 | B2 | 6/2008 | Bäurle et al. |
| 7,538,533 | B2 * | 5/2009 | Baurle et al. ............ 323/284 |

OTHER PUBLICATIONS

"LNK501 LinkSwitch® Family, Energy Efficient, CV/CC Switcher for Very Low Cost Chargers and Adapters," Power Integrations, Inc. (Apr. 2003), pp. 1-20.

\* cited by examiner

*Primary Examiner*—Jessica Han
(74) *Attorney, Agent, or Firm*—Blakely Sokoloff Taylor & Zafman, LLP

(57) ABSTRACT

Various techniques directed to providing temporary peak power from a switching regulator are disclosed. In one aspect, a switching regulator includes a switch that is to be coupled between a power supply input and an energy transfer element of the power supply. A controller is coupled to be responsive to a feedback signal to be received from an output of the power supply. The controller is coupled to switch the switch in response to the feedback signal to regulate the output of the power supply. An oscillator is coupled to provide an oscillating signal to the controller to determine a maximum switching frequency of the switch. The oscillating signal is coupled to oscillate at a first frequency under a first moderate load condition at the power supply output. The oscillating signal is coupled to oscillate at a second frequency under a second peak load condition at the power supply output.

14 Claims, 8 Drawing Sheets

METHOD AND APPARATUS TO PROVIDE TEMPORARY PEAK POWER FROM A SWITCHING REGULATOR

REFERENCE TO PRIOR APPLICATION

This application is a continuation of and claims priority to U.S. application Ser. No. 12/125,839, filed May 22, 2008, now pending, which is a continuation of U.S. application Ser. No. 11/805,725, filed May 23, 2007, now U.S. Pat. No. 7,388,360, which is a continuation of U.S. application Ser. No. 10/981,959, filed Nov. 5, 2004, now U.S. Pat. No. 7,239,119. U.S. application Ser. No. 12/125,839 and U.S. Pat. Nos. 7,388,360 and 7,239,119 are hereby incorporated by reference.

BACKGROUND

1. Technical Field

The present invention relates generally to electronic circuits, and more specifically, the invention relates to switched mode power supplies.

2. Background Information

Many types of electronic equipment use varying amounts of power in normal operation. The range of power demanded from a power supply can be extreme, extending for example from a few milliwatts to nearly 100 watts. Large ranges of loading are common in equipment such as printers, digital video disc (DVD) recorders, and other products that require rapid activation of mechanical motion. Typically, a moderate continuous output power is required for a long duration, for example when a DVD disk is spinning continuously or the print head in a printer is moving across a page. However, a maximum or peak output power is usually required for a relatively short duration and infrequently, for example to reverse the direction of a moving printer head or to spin a disk from startup to its rated speed. Equipment to amplify signals that have a large dynamic range, such as music, for example, can demand power that covers a range of several orders of magnitude.

Designers of power supplies for these applications are challenged to provide a wide range of power while conforming to conflicting requirements of efficiency, size, and cost. Power supplies that can deliver the maximum or peak required power often require the use of components that are over rated for the continuous moderate power level. Efforts to meet the requirements for continuous moderate power and short duration peak power from the same power supply usually lead to designs that are larger, heavier, and more costly than necessary if the load range were limited.

BRIEF DESCRIPTION OF THE DRAWINGS

The present invention detailed illustrated by way of example and not limitation in the accompanying Figures.

DETAILED DESCRIPTION

Embodiments of a power supply regulator that may be utilized in a power supply are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
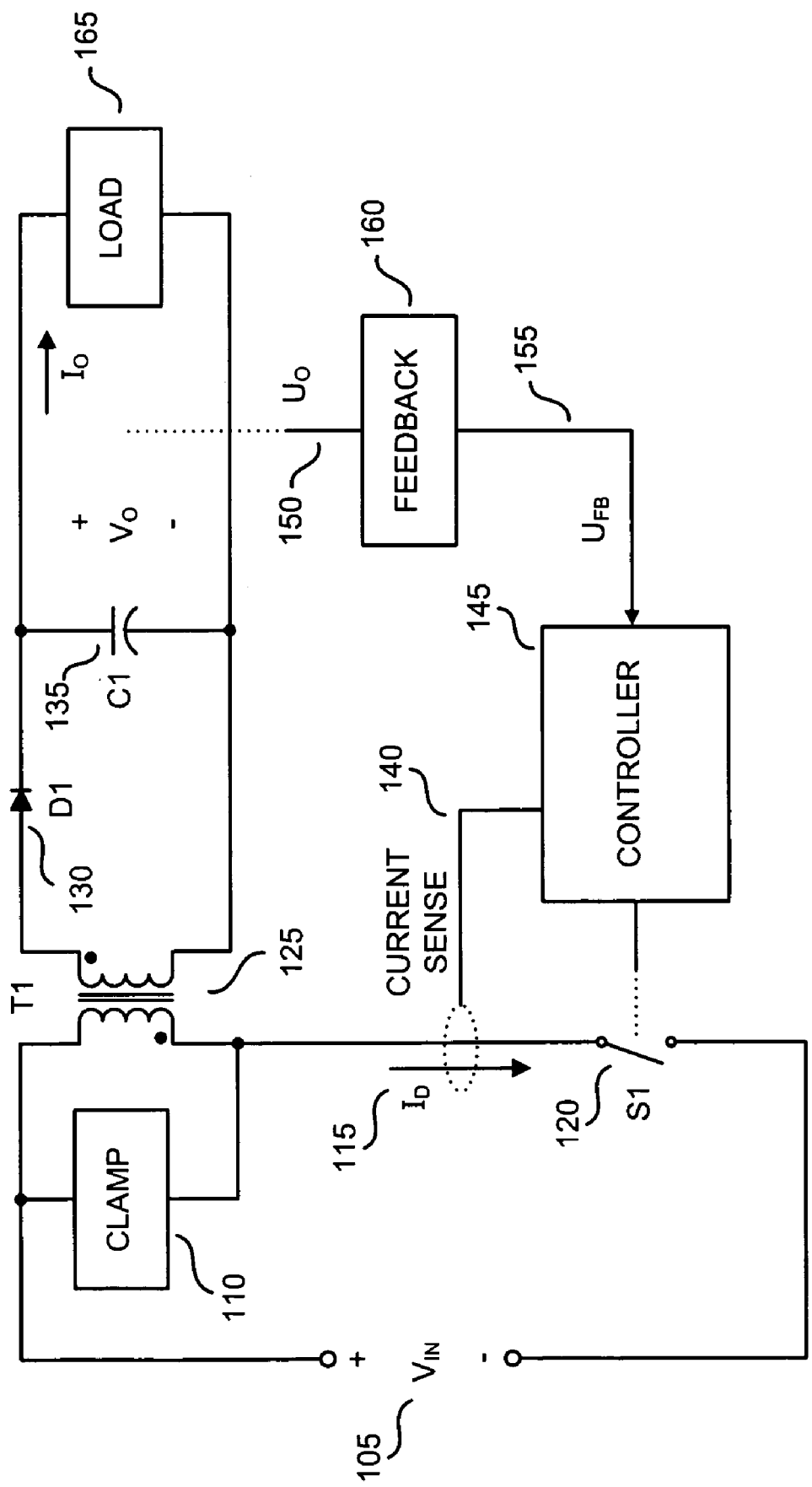
FIG. 1 is a functional block diagram of a power supply that may include a switching regulator in accordance with the teachings of the present invention.

FIG. 1 shows a functional block diagram of a power supply that may include an embodiment of a power supply regulator in accordance with the teachings of the present invention. The topology of the power supply illustrated in FIG. 1 is known as a flyback regulator. It is appreciated that there are many topologies and configurations of switching regulators, and that the flyback topology shown in FIG. 1 is provided to illustrate the principles of an embodiment of the present invention that may apply also to other types of topologies in accordance with the teachings of the present invention. The power supply in FIG. 1 provides output power to a load 165 from an unregulated input voltage $V_{IN}$ 105. The input voltage $V_{IN}$ 105 is coupled to an energy transfer element T1 125 and a switch S1 120. In the example of FIG. 1, the energy transfer element T1 125 is coupled between an input of the power supply and an output of the power supply. In the example of FIG. 1, the energy transfer element T1 125 is illustrated as a transformer with two windings. A clamp circuit 110 is coupled to the primary winding of the energy transfer element T1 125 to control the maximum voltage on the switch S1 120. Switch S1 120 is switched on and off in response to one embodiment of a controller circuit 145 in accordance with the teachings of the present invention. In one embodiment, switch S1 120 is a transistor such as for example a power metal oxide semiconductor field effect transistor (MOSFET). In one embodiment, controller 145 includes integrated circuits and discrete electrical components. The operation of switch S1 120 produces pulsating current in the rectifier D1 130 that is filtered by capacitor C1 135 to produce a substantially constant output voltage $V_O$ or output current $I_O$ at the load 165.

The output quantity to be regulated is $U_O$ 150, that in general could be an output voltage $V_O$, an output current $I_O$, or a combination of the two. A feedback circuit 160 is coupled to the output quantity $U_O$ 150 to produce a feedback signal $U_{FB}$ 155 that is an input to the controller 145. Another input to the controller 145 is the current sense signal 140 that senses a current $I_D$ 115 in switch S1 120. Any of the many known ways to measure a switched current, such as for example a current transformer, or for example the voltage across a discrete resistor, or for example the voltage across a transistor when the transistor is conducting, may be used to measure current $I_D$ 115.

In one embodiment, the controller 145 operates switch S1 120 to substantially regulate the output $U_O$ 150 to its desired value. In one embodiment, controller 145 includes an oscillator that defines substantially regular switching periods. In one embodiment, regulation is accomplished by control of the conduction time of the switch within a switching period. In each switching period, the fraction of the switching period that the switch is closed is the duty ratio of the switch. As will be discussed, one embodiment of the oscillator included in controller 145 is configured to switch temporarily at a higher frequency to accommodate temporary peak load conditions in accordance with the teachings of the present invention.

Figure 2:
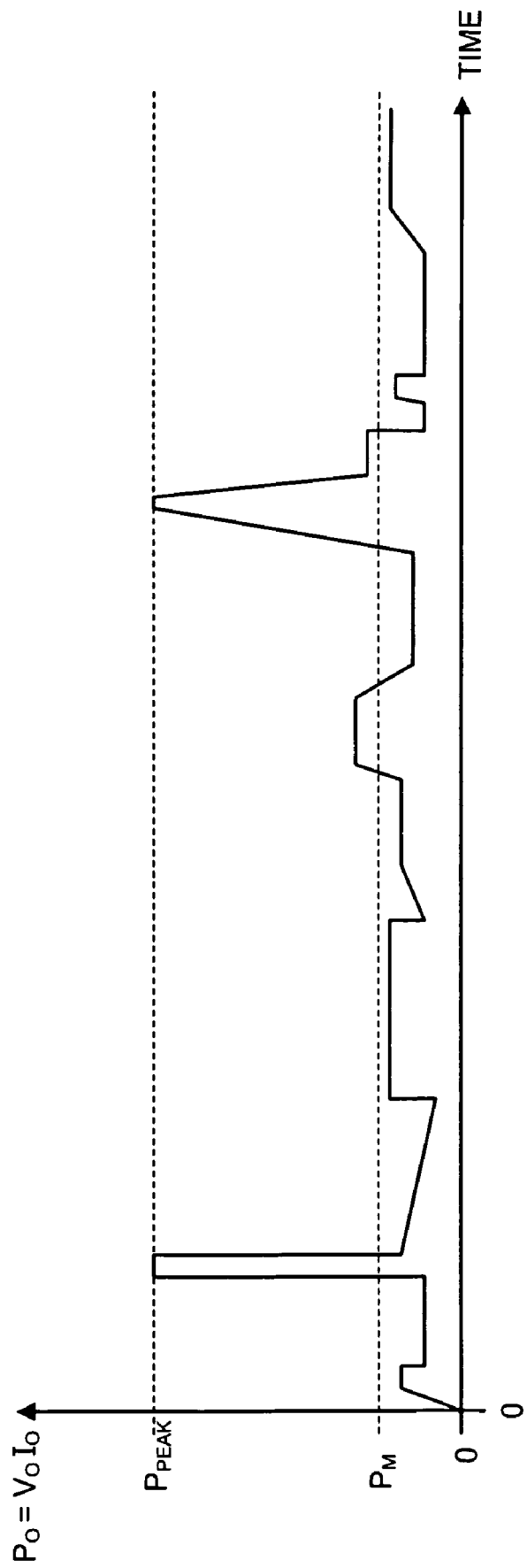
FIG. 2 is a graph of a typical power demand for a switching regulator in accordance with the teachings of the present invention.

The instantaneous output power $P_O$ is the output voltage $V_O$ multiplied by the output current $I_O$. The load draws an output power $P_O$ that may change abruptly with time. FIG. 2 shows a graph of the output power demand of a typical load that may be accommodated by a power supply regulator in accordance with the teachings of the present invention. A distinguishing characteristic of the power requirement of FIG. 2 is that the power is below a moderate level $P_M$ most of the time, going above $P_M$ only occasionally, and rising to a much higher peak level $P_{PEAK}$ infrequently for short durations. In this description, moderate power level $P_M$ describes a level of output power that typically determines the thermal design of the power supply. Embodiments of a power supply in accordance with the teachings of the present invention are therefore designed to provide this moderate output power continuously, the various power supply components not exceeding their thermal ratings. In this description, therefore, this moderate power level is much higher than very low output power operating conditions, such as no-load and standby, which are also often required operating conditions in power supply applications. For purposes of this disclosure, no-load is a condition where the output load of the power supply is removed altogether. For purposes of this disclosure, standby is a condition where the power supply output load is demanding a very low power, for example in a DVD application where the DVD player is waiting for a wake up signal from a remote controller. These no-load and standby conditions are typically substantially lower than the moderate power level, $P_M$, as discussed here. As an example, in a DVD player, the peak output power requirement could be 20 watts, the continuous moderate output power requirement could be 10 watts and a standby output power could be less than 0.5 watts. No-load and standby conditions may require other long duration or continuous power supply operating modes, such as burst-modes and very low switching frequency, that are implemented when the output power demand falls below a no-load or standby power threshold, as will be known to one skilled in the art. The duration of the peak power, $P_{PEAK}$, demand is usually much less than one second, and well below the thermal time constants of the electrical components in the switching regulator. Therefore, in many applications, the ability of the switching regulator to deliver the peak power is not restricted by the thermal limitations of the components. The regulator's peak power is limited by the maximum current of the components and by the switching frequency.

Owing to the limitations of one or more components in the circuit, the switches in all regulator designs have a maximum current limit $I_{MAX}$ that they cannot exceed. Although all switches are inherently current limited, controllers in switching regulators usually prevent the switches from exceeding the maximum current limit for the design.

FIG. 3 shows waveforms of the current $I_D$ in the switch of a switching regulator at two switching frequencies that correspond to the switching periods T1 and T2. Each current has the same maximum value $I_{MAX}$. The regulator operates at the same input voltage and output voltage for each frequency. Measurements of the waveforms show that operation of the regulator at the higher frequency provides about 60% more output power than operation at the lower frequency in the example illustrated in FIG. 3.

Figure 3A:
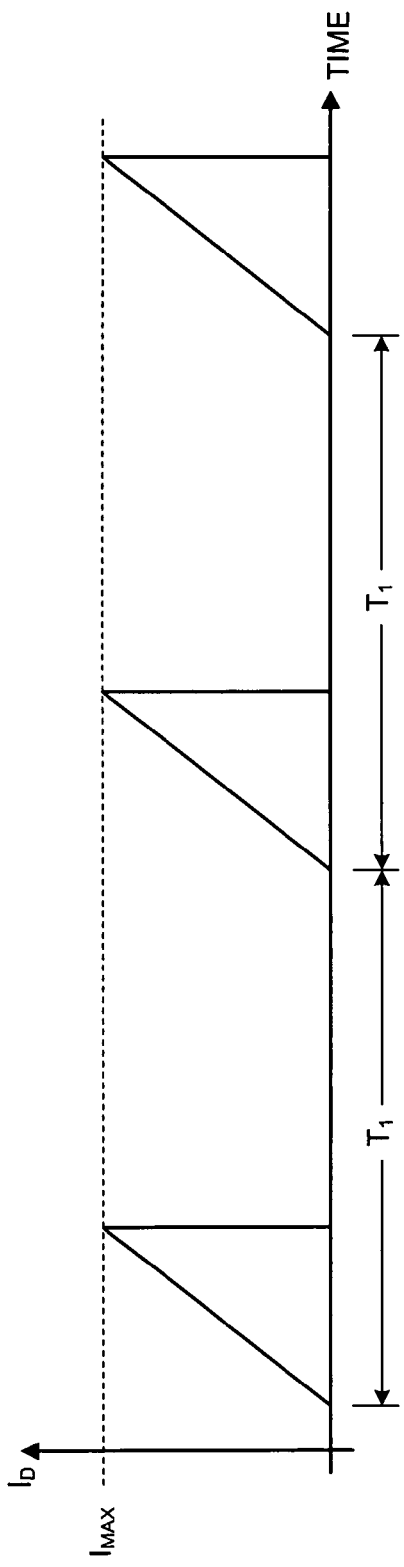
FIG. 3 shows waveforms of the current in the switch of a switching regulator for two switching frequencies in accordance with the teachings of the present invention.
Figure 3B:
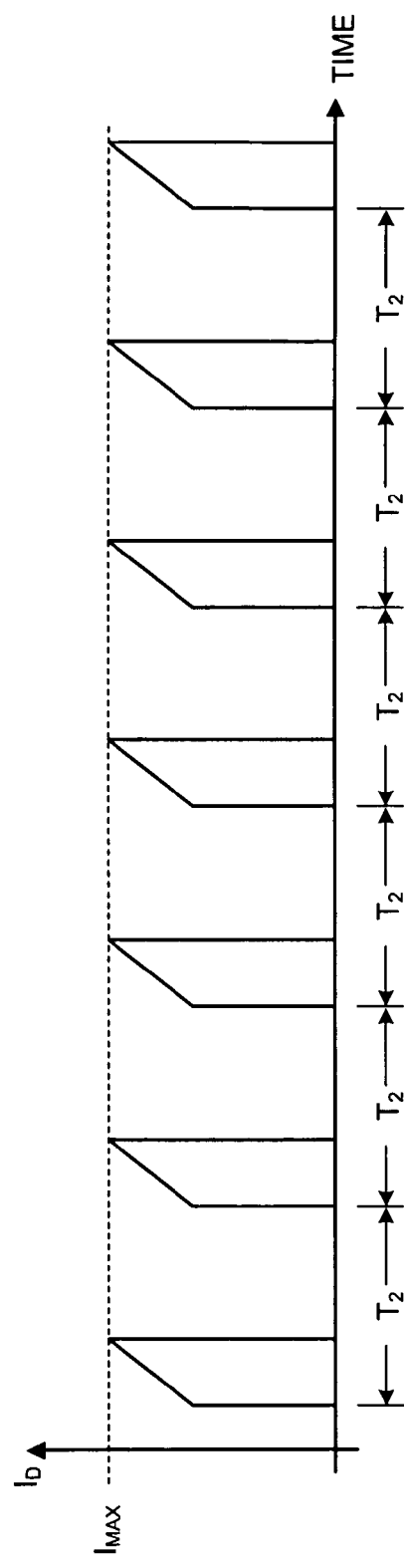

The waveforms in FIG. 3 also illustrate two fundamental modes of operation, indicated by the different shapes of the current. The triangular shape in FIG. 3A is characteristic of discontinuous conduction mode (DCM), whereas the trapezoidal shape in FIG. 3B is characteristic of continuous conduction mode (CCM).

For a given maximum switch current $I_{MAX}$, the maximum output power for a switching regulator is described by two simple functions of the switching frequency:

$$P = \left(\frac{P_{MAXDCM}}{f_{SMAXDCM}}\right) f_S \quad 0 \leq f_S \leq f_{SMAXDCM} \quad \text{(Equation 1)}$$

and $$P = P_{MAXDCM}\left(2 - \frac{f_{SMAXDCM}}{f_S}\right) \quad f_S \geq f_{SMAXDCM} \quad \text{(Equation 2)}$$

where $f_S$ is the switching frequency, $P_{MAXDCM}$ is the maximum power in discontinuous conduction mode, and $f_{SMAXDCM}$ is the maximum switching frequency in discontinuous conduction mode that allows the current in the switch to reach $I_{MAX}$. The values of $P_{MAXDCM}$ and $f_{SMAXDCM}$ are determined by the values of the components in the circuit, as will be understood by one skilled in the art. As such, they are constants in the expressions.

Figure 4:
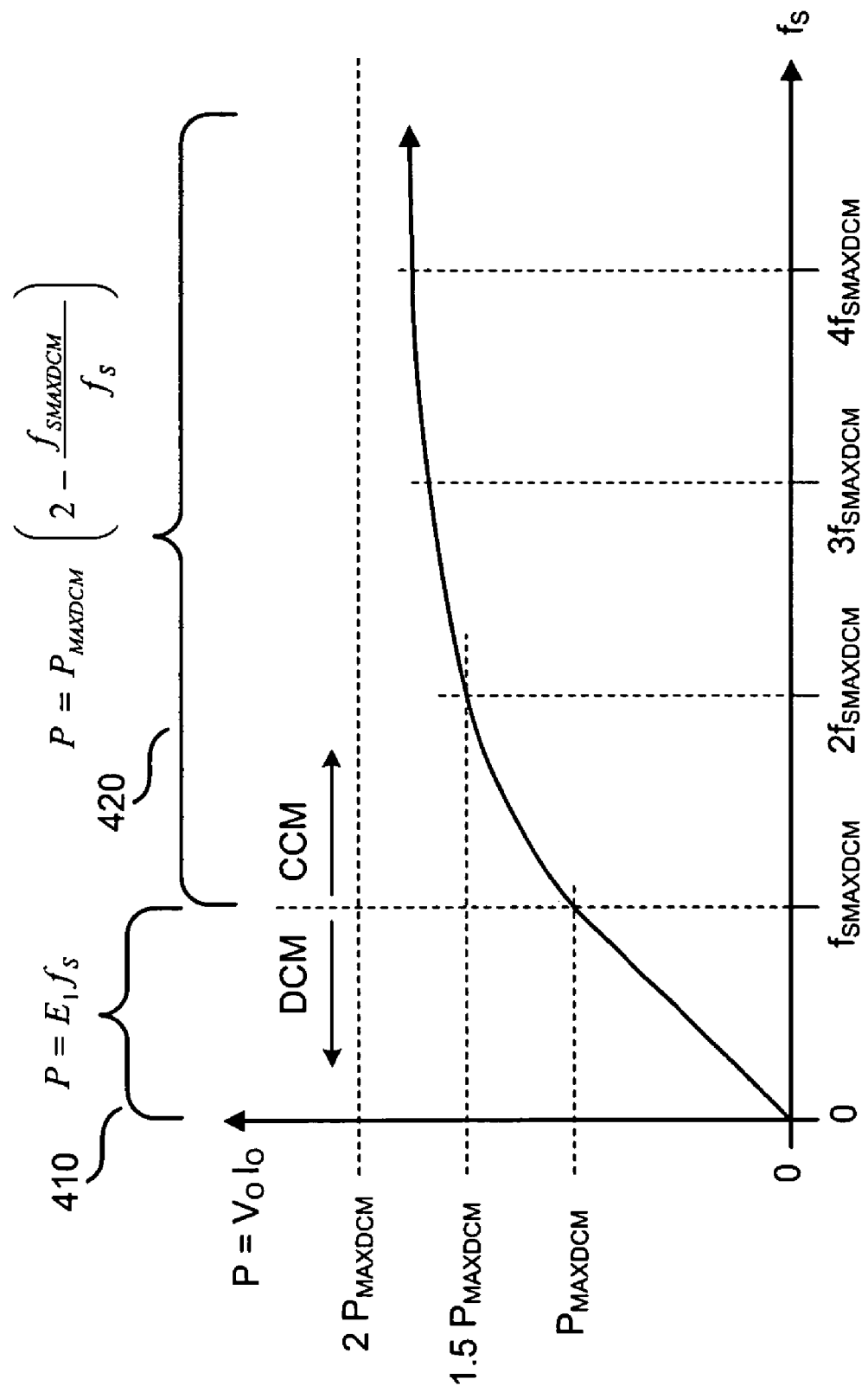
FIG. 4 is a graph of the maximum theoretical output power for a switching regulator as a function of switching frequency in accordance with the teachings of the present invention.

FIG. 4 graphs the relationship between the theoretical maximum output power and the switching frequency of a switching regulator that has a current limited switch. The relationship is linear as described by Equation 1 in the region 410 between zero frequency and $f_{SMAXDCM}$, the maximum frequency in discontinuous conduction mode. In the linear region 410, the output power is directly proportional to the switching frequency $f_S$. The maximum power in discontinuous conduction mode is $P_{MAXDCM}$ at switching frequency $f_{SMAXDCM}$.

In the region 420, at frequencies greater than $f_{SMAXDCM}$, the regulator operates in continuous conduction mode. In continuous conduction mode, the power is hyperbolic as described by Equation 2, approaching a maximum of twice $P_{MAXDCM}$. FIG. 4 shows that higher switching frequency gives higher output power. Unfortunately, higher switching frequency also gives higher losses since each switching cycle consumes power. Therefore, in one embodiment of the present invention, a switching regulator operates at the lowest switching frequency necessary to deliver the required output power up to a maximum frequency, where the maximum frequency is varied depending on the output power demand, while meeting the constraints for size and cost.

Figure 5:
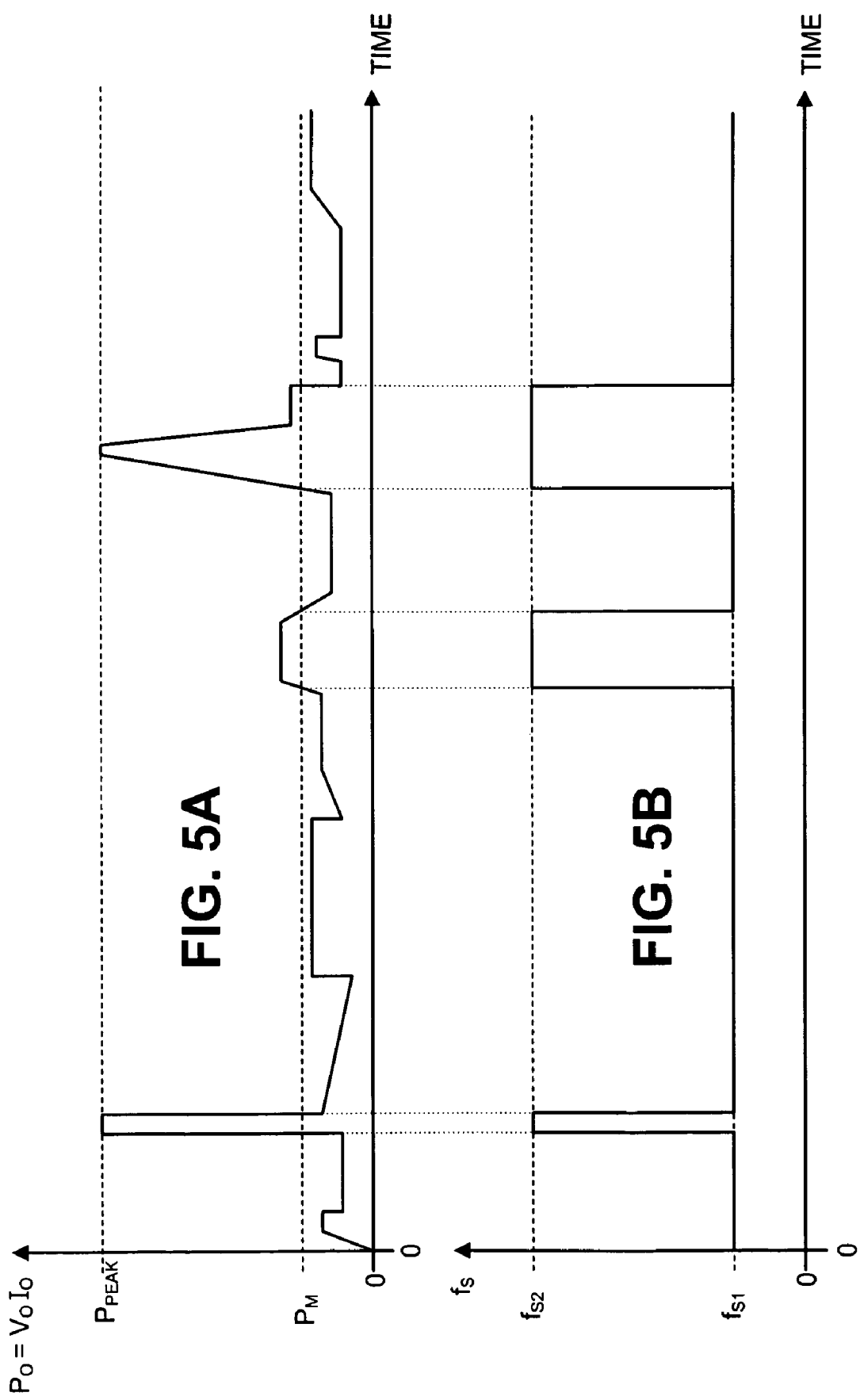
FIG. 5 shows graphs of power demand and corresponding switching frequency for one embodiment of a switching regulator in accordance with the teachings of the present invention.

In one embodiment, a switching regulator has a first maximum switching frequency when the output power is less than a moderate power $P_M$, and has a substantially higher second maximum frequency when the output power is higher than $P_M$. FIG. 5 illustrates the relationship between output power and switching frequency in one embodiment of the invention. When the output power requirement of FIG. 5A goes above the moderate level $P_M$, the switching frequency of FIG. 5B shifts from a low value $f_{S1}$ to a higher value $f_{S2}$.

Figure 6:
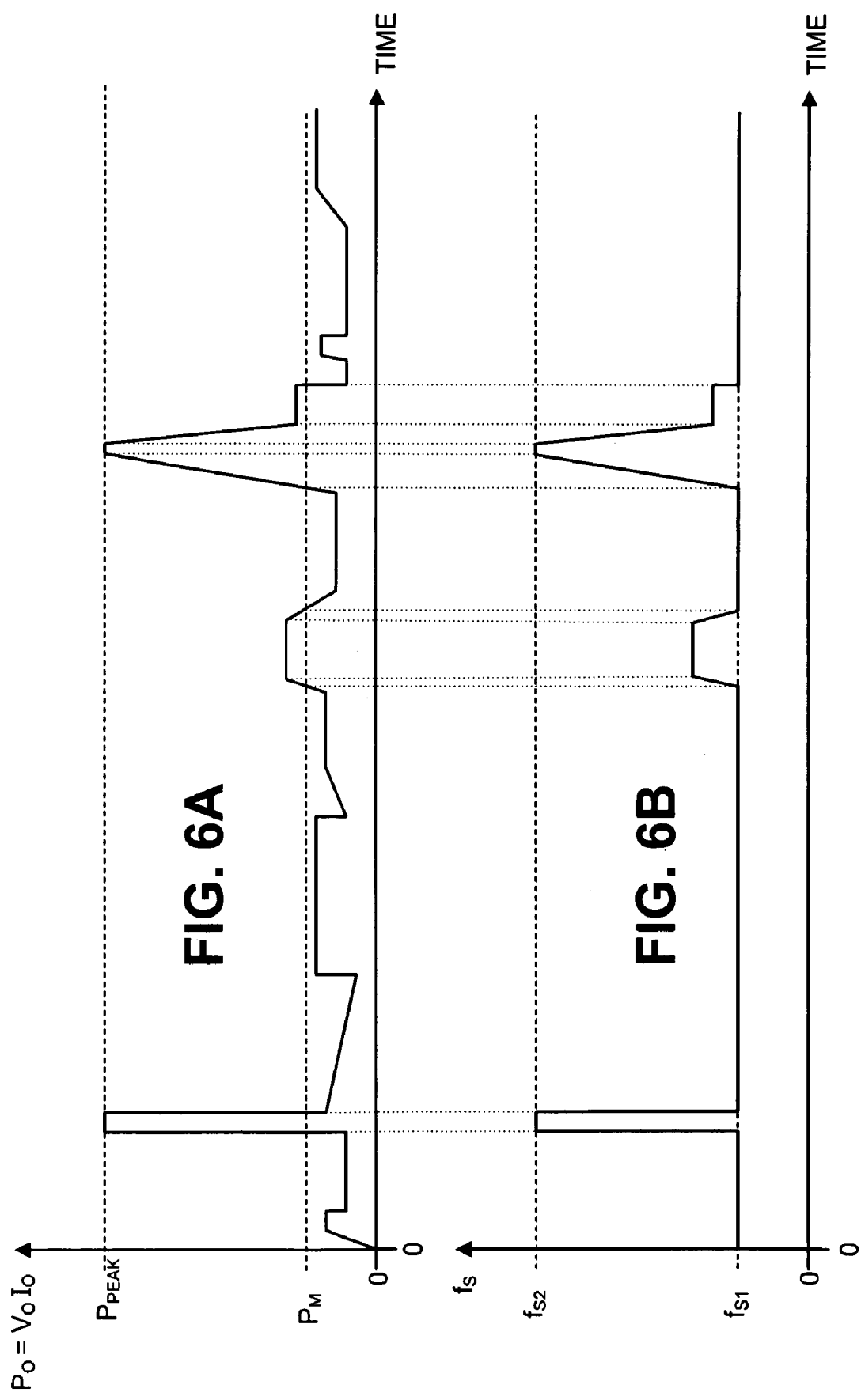
FIG. 6 shows graphs of power demand and an alternative corresponding switching frequency for one embodiment of a switching regulator in accordance with the teachings of the present invention.

The shift in frequency can be one discrete step as illustrated in FIG. 5B, or it can include multiple discrete steps that correspond to intermediate peak power levels, or it can change continuously to meet the power demand as illustrated in FIG. 6B to meet the requirements of special loads. A step shift between two frequencies is usually adequate to satisfy typical specifications. In one embodiment, the change in switching frequency adjusts only the maximum power capability of the regulator and regulation of the output is accomplished by adjustment of a different variable, such as the conduction time of the switch. In another embodiment the frequency shift can be varied up to a maximum value of $f_{S2}$ to regulate the output when the output power requirement goes above the moderate level $P_M$, while the frequency is fixed at a value of $f_{S1}$ for load conditions between the moderate level $P_M$ and the substantially lower power of either no-load or standby. When the output power requirement is between the moderate level $P_M$ and the substantially lower power of no-load or standby regulation of the output may be accomplished by adjustment of a variable other than switching frequency, such as the conduction time of the switch. In one embodiment, independent of the regulation technique used when the output power requirement goes above the moderate level $P_M$, the frequency may be varied to a value below $f_{S1}$ when the output power requirement drops below a lower threshold value that indicates operation either in no-load or standby condition. Other known techniques such as burst operation may be employed to reduce power supply power consumption at no-load or standby. When the output power requirement is above the lower threshold indicating either a no-load or standby condition, regulation techniques can include PWM current mode or voltage mode, on/off control or quasi resonant control as will be known to one skilled in the art.

The shift to the higher maximum frequency for infrequent and short durations provides the required peak output power capability without the penalty of increased switching losses at moderate output power, and without the need to use larger components that are capable of higher currents. Components and a switching frequency can therefore be optimized to meet all requirements when the switching regulator provides the moderate power $P_M$. Then, the relationship in FIG. 4, described by Equation 1 and Equation 2, can be used to determine the increase in frequency required to provide the peak power $P_{PEAK}$ from the design that is optimized for the lower output power.

Figure 7:
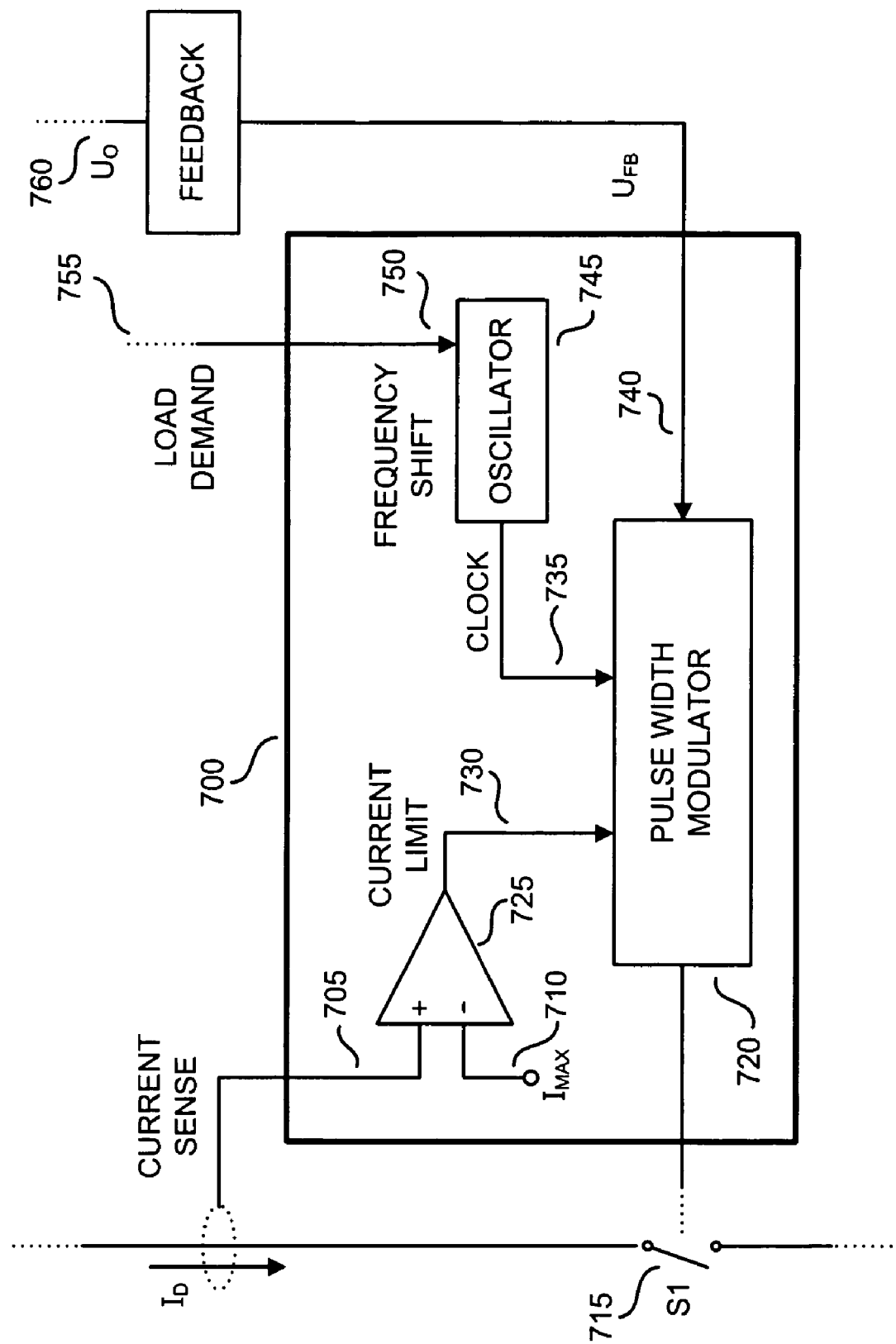
FIG. 7 shows functional elements of one embodiment of a controller for a switching regulator in accordance with the teachings of the present invention.

FIG. 7 shows one embodiment of a controller for a switching regulator in accordance with the teachings of the present invention. Controller 700 includes a pulse width modulator 720 that receives a current limit signal 730, a clock signal 735, and feedback signal 740. The controller operates switch S1 715 of the switching regulator to regulate an output $U_O$ 760 to its desired value. In one embodiment, the controller operates switch S1 715 with a maximum switching frequency that is substantially independent of the input of the power supply. In one embodiment, controller 700 includes integrated circuits. In one embodiment, controller 700 is included in an integrated circuit. In one embodiment, controller 700 and switch S1 715 are integrated on a monolithic integrated circuit.

Current limit comparator 725 receives a current sense signal 705 that is proportional to the current in switch S1 715. When the current sense signal 705 exceeds a reference $I_{MAX}$ 710 that corresponds to a maximum permissible current in switch S1 715, current limit signal 730 goes from a logic low level to a logic high level. A logic high level of the current limit signal 730 forces pulse width modulator 720 to open switch S1. Pulse width modulator 720 can also open switch S1 715 to regulate the output $U_O$ even when the current limit signal 730 is low.

Clock signal 735 from oscillator 745 establishes the switching frequency and the switching periods. The oscillator 745 changes the frequency of the clock signal 735 in response to the signal at a frequency shift input 750. The frequency shift input 750 receives a load demand signal 755 that corresponds to the power requirement of the load. Power that exceeds a moderate level increases the switching frequency. In various embodiments, the load demand signal 755 may sense the load directly, or it may be an external system command that anticipates an increase in load. In one embodiment the load demand signal 755 may be generated by sensing the loss of feedback signal 740 or a magnitude of the feedback signal 740 for a predetermined period, depending on the particular embodiment, which would also indicate that the moderate power $P_M$ load capabilities of the switching regulator have been exceeded. In that case, the load demand signal 755 may be combined with the feedback signal 740 to sense when the power demand has exceeded the moderate power $P_M$ load capabilities of the switching regulator.

Figure 8:
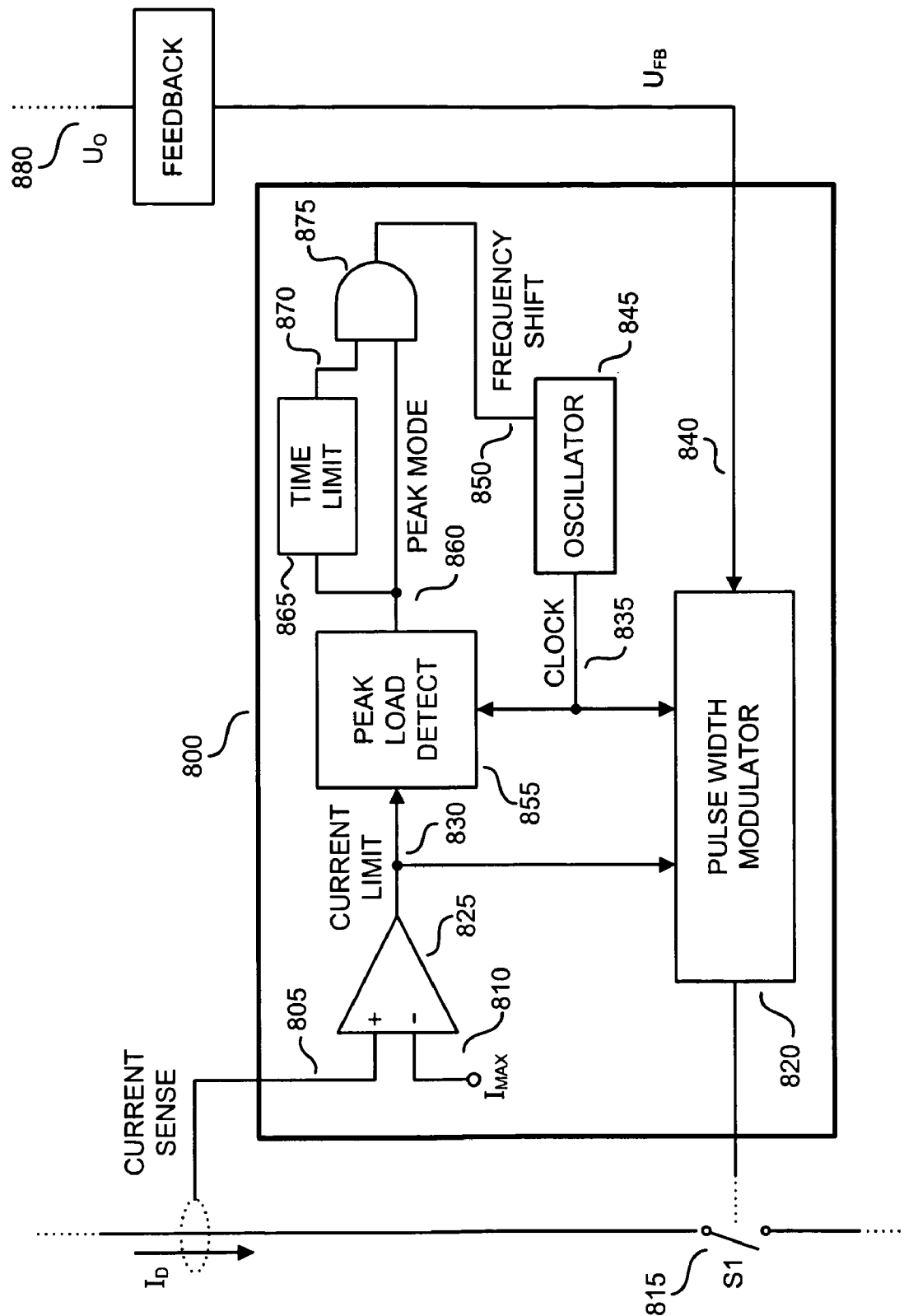
FIG. 8 shows another embodiment of a controller for a switching regulator in accordance with the teachings of the present invention.

FIG. 8 shows an embodiment of a controller 800 that does not receive an external load demand signal. Instead, the controller 800 senses the current in the switch S1 815 to determine the load demand. Controller 800 in FIG. 8 includes pulse width modulator 820 that receives a current limit signal 830, a clock signal 835, and a feedback signal 840. The controller operates switch S1 815 of the switching regulator to regulate an output $U_O$ 880 to its desired value.

Current limit comparator 825 receives a current sense signal 805 that is proportional to the current in switch S1 815. When the current sense signal 805 exceeds a reference $I_{MAX}$ 810 that corresponds to a maximum permissible current in switch S1 815, current limit signal 830 goes from a logic low level to a logic high level, forcing pulse width modulator 820 to open switch S1. Pulse width modulator 820 can open switch S1 815 to regulate the output even when the current limit signal 830 is low.

Clock signal 835 from oscillator 845 establishes the switching frequency. The oscillator 845 changes the frequency of the clock signal 835 in response to the signal at a frequency shift input 850. In the embodiment of FIG. 8, the frequency shifts between two values. The switching frequency is at its lower value when the frequency shift signal at frequency shift input 850 is at a logic low level. The switching frequency is at its upper value when the frequency shift signal is at a logic high level.

A peak load detect circuit 855 receives the current limit signal 830 and the clock signal 835 to determine if the load requires more than a moderate level of power. One can select among many different techniques to distinguish peak load from moderate load, depending on the particular regulator topology, control method, and nature of the load in accordance with the teachings of the present invention. For example, the peak load detect circuit 855 can count the number of switching periods that are current limited, or for example, the peak load detect circuit 855 can respond to a particular sequence of switching periods that are current limited and not current limited.

When the peak load detect circuit 855 determines that there is a peak load event, the peak mode signal 860 changes from a logic low level to logic high level. An optional time limit circuit 865 can be used with AND gate 875 to restrict or limit the duration of time of the peak power output. A time limit circuit may be employed to reduce the possibility of damage to the regulator from a fault that demands a high load for an excessive time. The time limit circuit 865 sets its output 870 to a logic high level when the peak mode signal 860 goes to a logic high level. The output 870 of the time limit circuit 865 goes to a logic low level after the maximum permitted duration of a peak load event, returning the switching frequency to its lower value. In other embodiments, other circuits may be employed to perform the function of the time limit circuit 865 in accordance with the teachings of the present invention.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A controller, comprising:
 a pulse width modulator coupled to receive a clock signal, wherein the pulse width modulator is to be coupled to control a switch to regulate an output level of a power supply responsive to the clock signal;
 a current limit comparator having a first input, a second input, and an output, wherein the first input is to be coupled to receive a current sense signal representative of a current through the switch, wherein the second input is coupled to receive a reference signal, and wherein the output produces a current limit signal to indicate whether the current sense signal exceeds the reference signal;
 a peak load detect circuit coupled to receive the current limit signal to determine if a load of the power supply requires more than a moderate level of power; and
 an oscillator coupled to the pulse width modulator to generate the clock signal, wherein the clock signal has a first maximum frequency when the peak load detect circuit determines that the load of the power supply does not require more than a moderate level of power and wherein the clock signal has a second maximum frequency when the peak load detect circuit determines that the load of the power supply requires more than a moderate level of power.

2. The controller of claim 1, wherein the current sense signal is proportional to the current through the switch.

3. The controller of claim 1, wherein the reference signal corresponds to a maximum permissible current in the switch.

4. The controller of claim 1, wherein the controller is included in an integrated circuit.

5. The controller of claim 1, wherein the controller and the switch are integrated on a monolithic integrated circuit.

6. The controller of claim 1, wherein the pulse width modulator is further coupled to receive a feedback signal from the power supply and wherein a duty cycle of the pulse width modulator is responsive to the feedback signal.

7. The controller of claim 1, wherein the pulse width modulator is further coupled to receive the current limit signal and to open the switch if the current limit signal indicates that the current sense signal exceeds the reference signal.

8. The controller of claim 1, wherein the second maximum frequency is greater than the first maximum frequency.

9. The controller of claim 1, wherein a switching frequency of the pulse width modulator is substantially constant when peak load detect circuit determines that the load of the power supply does not require more than the moderate level of power and when the load of the supply requires more than a no-load or standby amount of power.

10. The controller of claim 1, wherein a switching frequency of pulse width modulator is varied up to the second maximum frequency to regulate a power level at the output of the power supply when the peak load detect circuit determines that the load of the power supply requires more than the moderate level of power.

11. The controller of claim 1, wherein a switching frequency of the pulse width modulator is substantially equal to the first maximum frequency of the clock signal when the peak load detect circuit determines that the load of the power supply does not require more than the moderate level of power and wherein the switching frequency is substantially equal to the second maximum frequency when the peak load detect circuit determines that the load of the power supply requires more than the moderate level of power.

12. The controller of claim 1, wherein the peak load detect circuit is further coupled to receive the clock signal and wherein the peak load detect circuit is configured to determine that the load of the power supply requires more than the moderate level of power by counting a number of switching periods that are current limited.

13. The controller of claim 1, wherein the peak load detect circuit is further coupled to receive the clock signal and wherein the peak load detect circuit is configured to determine that the load of the power supply requires more than the moderate level of power by responding to a particular sequence of switching periods that are current limited and not current limited.

14. The controller of claim 1, further comprising a time limit circuit coupled between the peak load detect circuit and the oscillator to limit a duration of time that the oscillator generates the clock signal at the second maximum frequency.

* * * * *